Figure 1:
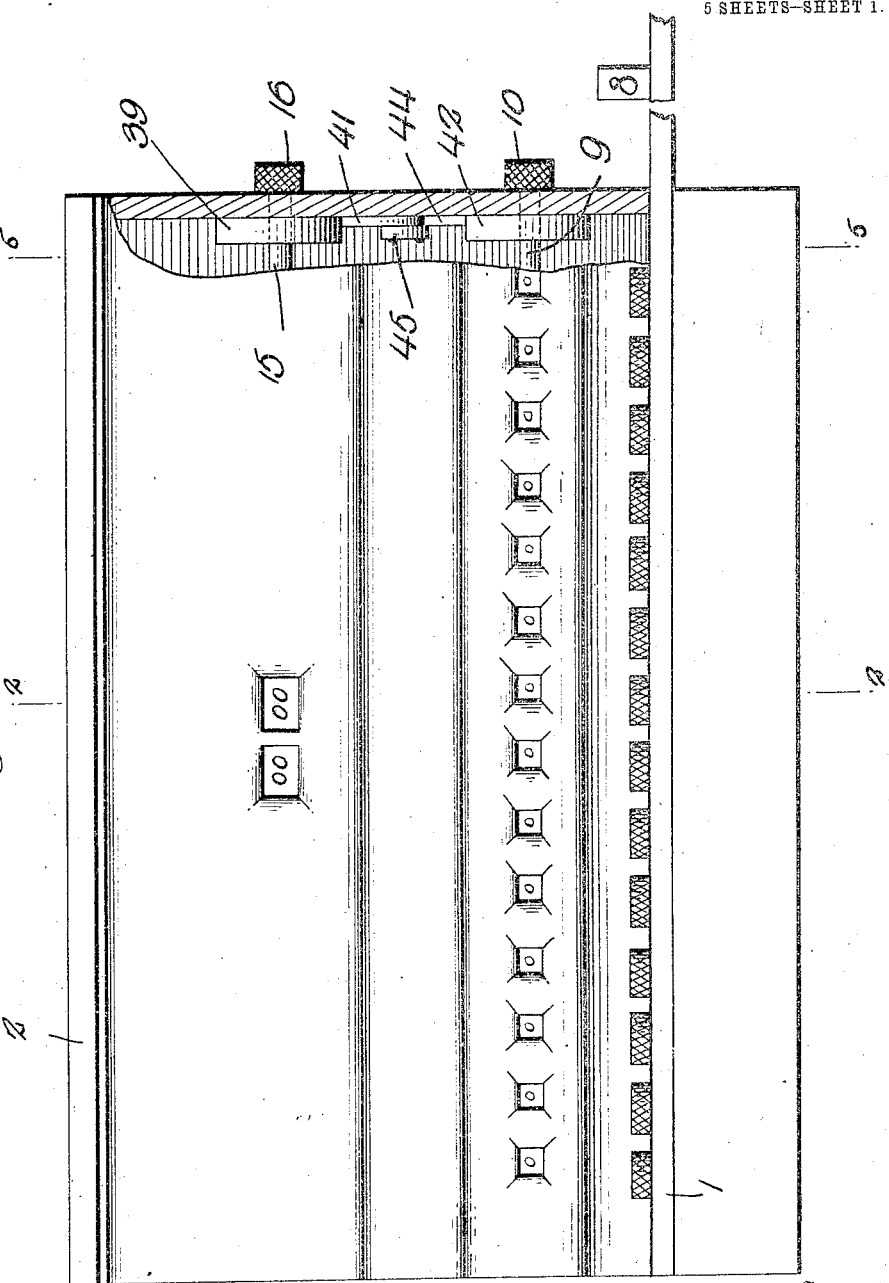

R. L. LOWERY.
LUMBER REGISTER.
APPLICATION FILED DEC. 18, 1909. RENEWED JUNE 29, 1911.

1,013,030.

Patented Dec. 26, 1911.
5 SHEETS—SHEET 1.

Witnesses
Chas. C. Richardson
V. B. Hillyard

Inventor
Robert L. Lowery,
By Victor J. Evans
Attorney

R. L. LOWERY.
LUMBER REGISTER.
APPLICATION FILED DEC. 18, 1909. RENEWED JUNE 29, 1911.

1,013,030.

Patented Dec. 26, 1911.
5 SHEETS—SHEET 3.

Fig. 3.

Witnesses
Chas. C. Richardson.
B. Hillyard.

Inventor
Robert L. Lowery,
by Victor J. Evans
Attorney

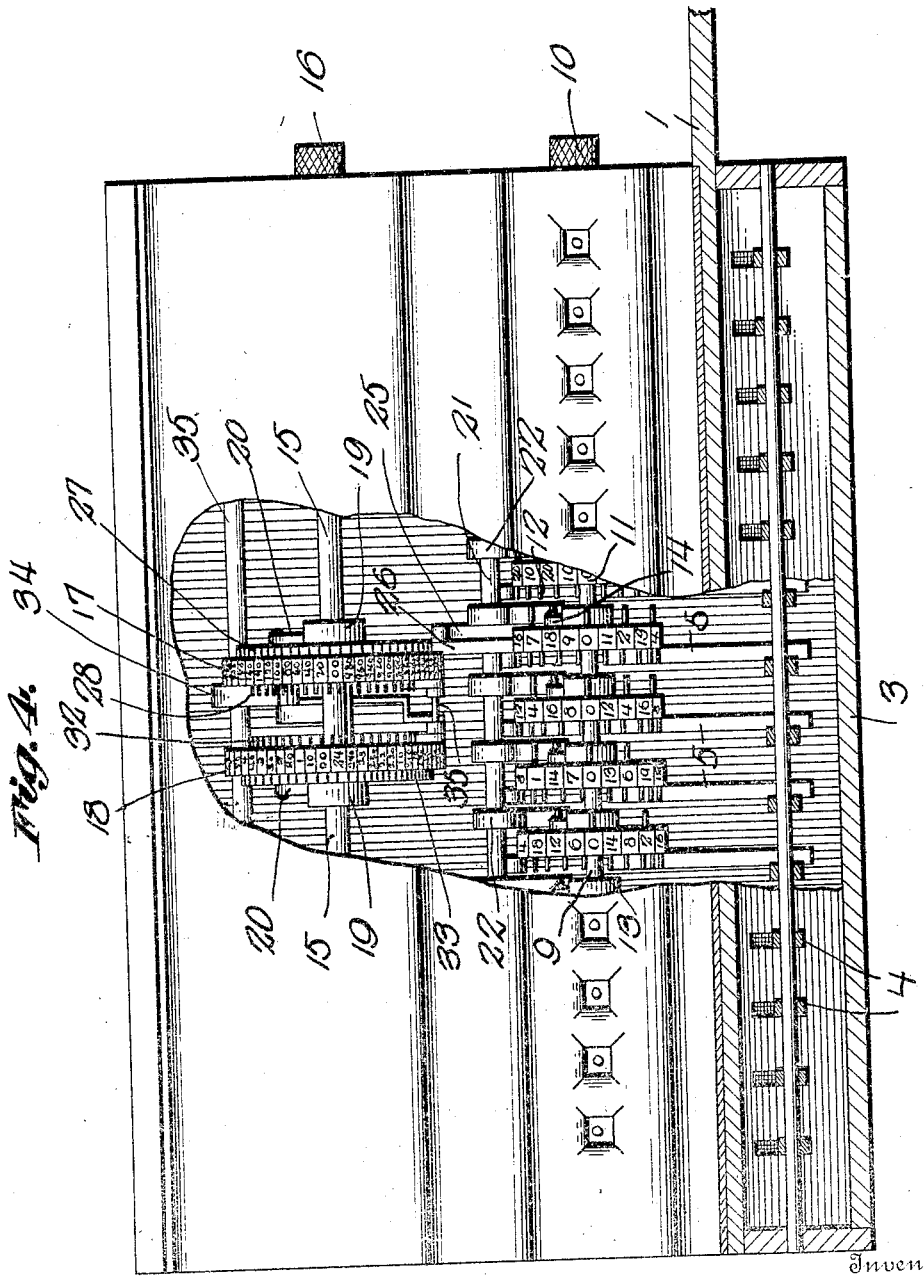

R. L. LOWERY.
LUMBER REGISTER.
APPLICATION FILED DEC. 18, 1909. RENEWED JUNE 29, 1911.
1,013,030.
Patented Dec. 26, 1911.
5 SHEETS—SHEET 5.
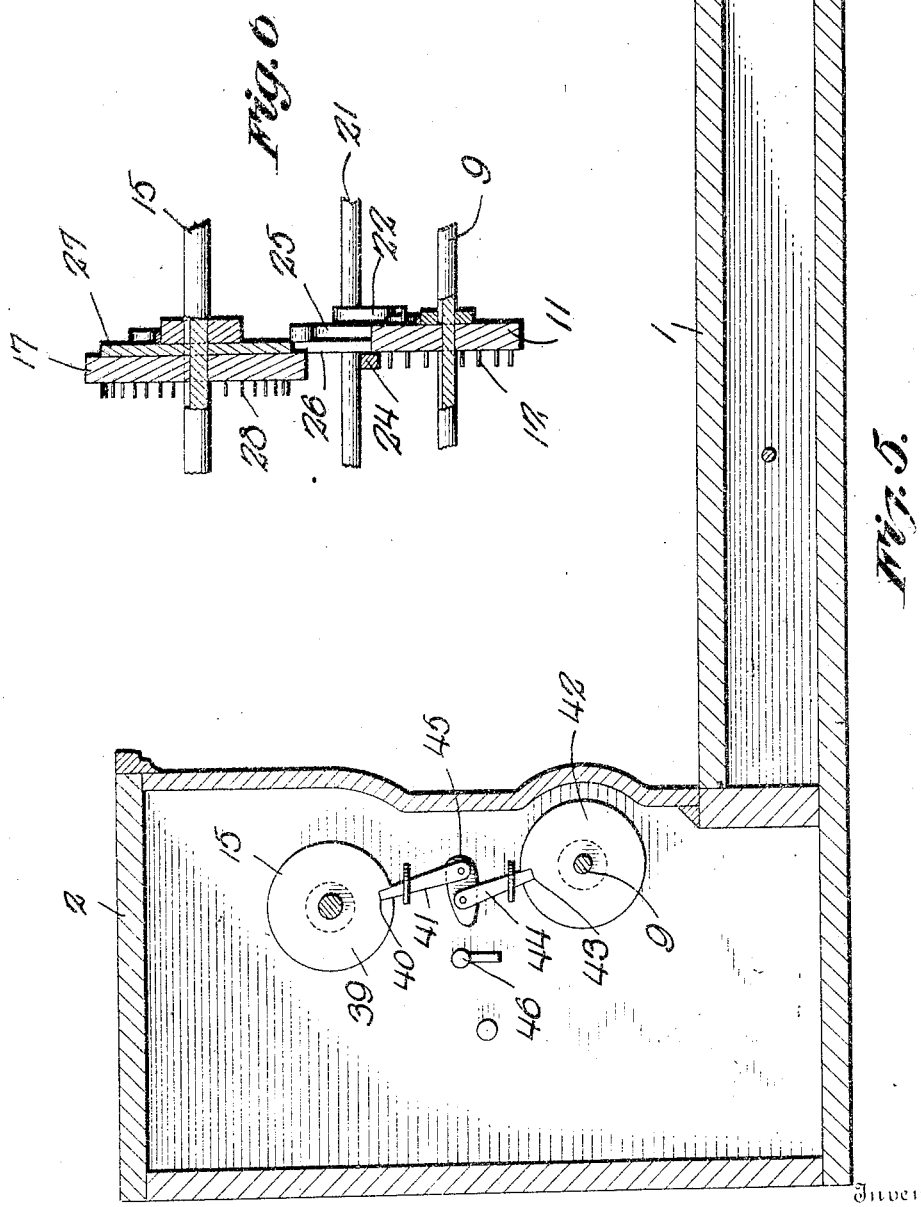
Witnesses
Chas. C. Richardson,
U. B. Hillyard.
Inventor
Robert L. Lowery,
By Victor J. Evans
Attorney

UNITED STATES PATENT OFFICE.

ROBERT L. LOWERY, OF SALISBURY, NORTH CAROLINA.

LUMBER-REGISTER.

1,013,030. Specification of Letters Patent. Patented Dec. 26, 1911.

Application filed December 18, 1909, Serial No. 533,868. Renewed June 29, 1911. Serial No. 636,227.

*To all whom it may concern:*

Be it known that I, ROBERT L. LOWERY, a citizen of the United States, residing at Salisbury, in the county of Rowan and State of North Carolina, have invented new and useful Improvements in Lumber-Registers, of which the following is a specification.

This invention has for its object to combine in a single structure means for measuring lumber of various heights and widths to determine the number of feet in boards and to register each measurement so that at the end of each day or other given period the total number of square feet of lumber disposed of may be ascertained, thereby facilitating the work of the merchant both with regard to determining the number of feet in the several boards handled and the sum total of the number of square feet handled or sold during the prescribed period.

The invention contemplates a measure including tables calculated for lumber of certain lengths and widths, so that the number of square feet in a board of given length and width may be ascertained at a glance on reference to the particular table.

The invention further contemplates a registering mechanism embodying a series of registering wheels each having a key, the series of wheels being mounted axially and each adapted to be operated by a particular key. Combined with the registering mechanism as a part thereof are registering wheels adapted to be actuated each time any one of the primary registering wheels moves a distance to indicate a given amount, which, in the present instance, is based upon numbers of twenty.

The invention further contemplates novel means for transmitting movement from the primary registering wheels to the totalizing registering wheels, so that as each primary registering wheel moves a distance to indicate twenty or the predetermined amount the initial totalizing wheel is moved forward one step to register twenty or the predetermined amount.

The invention also has for its object to combine with the registering mechanism peculiar lock means for securing the shafts upon which the several registering wheels are mounted, whereby at the end of each day or other period the several wheels may be returned to an initial position.

The invention further contemplates peculiar resetting means for returning the registering wheels to zero or initial position.

The invention consists of the novel features, details of construction and combination of parts, which hereinafter will be more particularly set forth, illustrated in the accompanying drawings, and pointed out in the appended claims.

Figure 2:
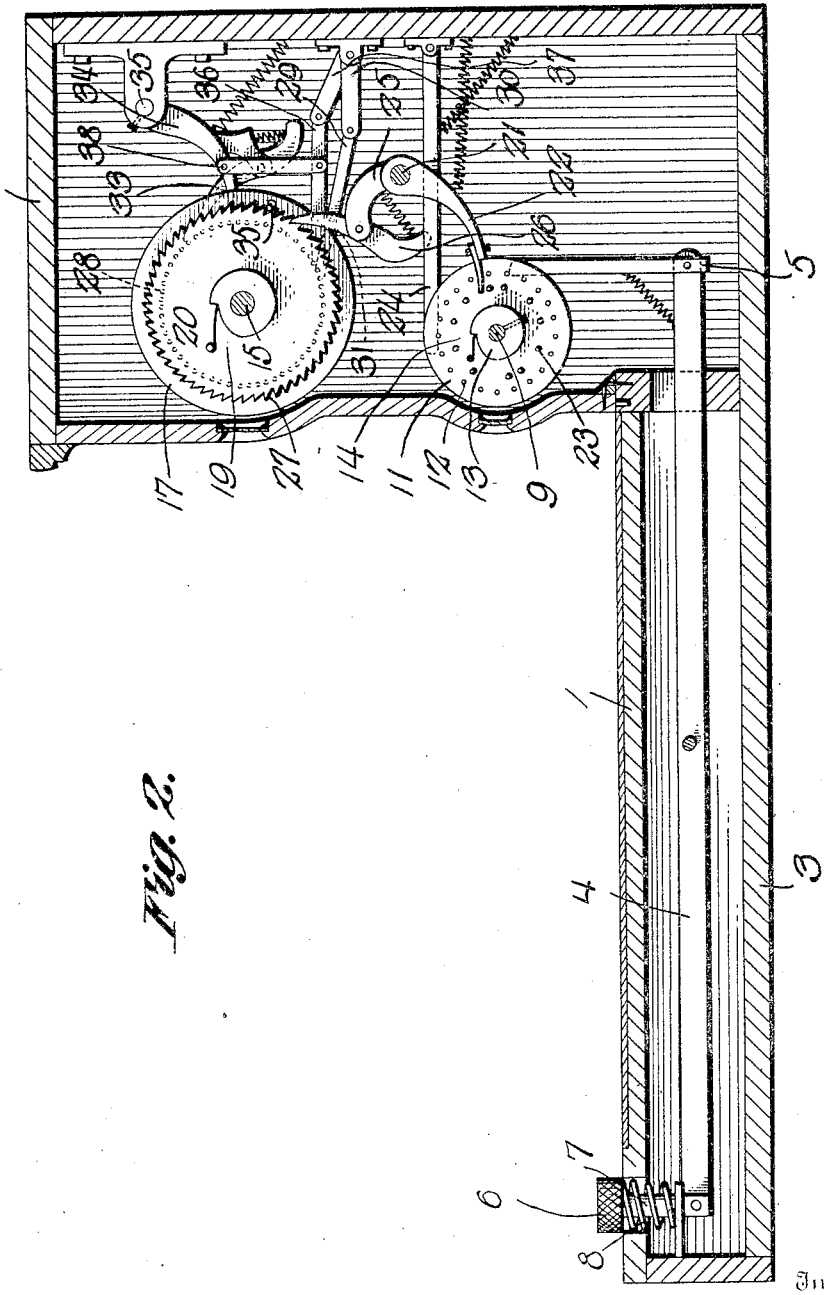

Referring to the drawings, forming a part of the specification, Figure 1 is a front view of a lumber register embodying the invention. Fig. 2 is a transverse section of the register on the line 2—2 of Fig. 1. Fig. 3 is a top plan view, showing more particularly the means for measuring lumber and the keys for operating the registering mechanism. Fig. 4 is a front view of the register partly in section with a portion of the front broken away to show the relation of the registering mechanism. Fig. 5 is a section on the line 5—5 of Fig. 1, looking to the right. Fig. 6 is a detail view in section of the primary and totalizing registering wheels, their amounts, and the intermediate connecting means for transmitting movement from one to the other.

Corresponding and like parts are referred to in the following description, and indicated in all the views of the drawings, by the same reference characters.

The register comprises a bed or table 1, which is provided with a series of graduated scales or tables to indicate the number of square feet in boards of varying lengths and widths. The lumber measure may be of any construction, such as generally provided for determining the measurements of lumber of varying dimensions. The bed or table has a series of scales of uniform length provided at their lower ends, adjacent the keys, with numbers corresponding to varying lengths of lumber. The numbers in the length of the scales indicate varying widths of material and the number of square feet in the lumber. A board eight feet long placed upon the table with its top edge in line with the inner ends of the scales and with its bottom edge about in line with the number three of the scale having eight at its foot, will contain three square feet. A board eighteen feet long similarly placed on the table and having its lower edge about in line with the numeral six on the scale having eighteen at its foot will contain six square feet. After the number of square feet of a board to be measured has been ascertained the number is marked up on the registering mechanism by operating one or more keys.

The registering mechanism is housed in a casing 2, which may be of any construction and design best adapted to receive the operating parts. The casing 2 is provided with an extension 3 in which is located a series of key operated levers 4 depressible at their outer ends and provided at their inner ends with jacks or operating bars 5. The keys 6 are connected by stems 7 with the outer ends of the levers 4, springs 8 being mounted upon the stems 7 so as to depress the keys 6. The various keys 6 are differently numbered so as to register the amount indicated thereon when the key is depressed.
A shaft 9 extends lengthwise of the casing 2 and is mounted therein and is provided at one end with a finger piece 10 to admit of turning the shaft 9 by hand when it is required to reset or return the registering wheels to zero or initial position. A series of registering wheels 11 are loosely mounted upon the shaft 9 and are differently numbered to correspond with the number indicated upon the coöperating key. A series of pins 12 project laterally from each of the registering wheels 11 and are adapted to be engaged by the respective jacks or operating bars 5. Upon depressing a key 6 the inner end of the coöperating lever 4 is moved upward, elevating the jack or bar 5 carried thereby and the upper end of the part 5 engaging with one of the pins 12 turns the registering wheel 11 the predetermined distance so as to register the amount indicated thereon. A series of cams 13 are mounted upon the shaft 9 and are secured thereto for rotation therewith. A cam 13 is provided for each registering wheel 11 and is adapted to coöperate with a pawl 14 carried by the registering wheel. Each cam 13 has a shoulder to be engaged by the pawl 14 of the registering wheel, whereby upon turning the shaft 9 backward by hand the registering wheels are reset or returned to initial position. A second shaft 15 parallels the shaft 9 and is arranged above the same and mounted in the casing and has one end extended and provided with a finger piece 16. Registering wheels 17 and 18 are mounted loosely upon the shaft 15 and are provided with numbers indicating certain amounts. The registering wheels 11 indicate the units or primary amounts, whereas the registering wheels 17 and 18 indicate the total amount.
Each time a given amount is registered by any one of the primary registering wheels 11 the registering wheel 17 is moved forward one step and each time the registering wheel 17 makes a complete revolution the registering wheel 18 is moved forward one step. The total amount indicated by one complete revolution of the registering wheel 17 is represented by each movement of the registering wheel 18. Cams 19 are mounted upon the shaft 15, one for each registering wheel and are secured to the shaft to turn therewith. A dog 20 is mounted upon each registering wheel 17 and 18 and is adapted to coöperate with the respective cams 19 to admit of returning the registering wheels to initial position upon operating the shaft 15 by means of the finger piece 16.

A shaft 21 is arranged parallel with the shafts 9 and 15 and has a series of dogs 22 fastened thereto so that each time any one of the dogs 22 is operated the shaft 21 is rocked and moves the registering wheel 17 forward one notch to register twenty or the predetermined amount indicated by the registering wheels 11. Each of the dogs 22, one being provided for each primary registering wheel 11, extends into the path of a series of pins 23 projected laterally from the opposite side of the registering wheel. When a registering wheel has moved forward a distance to indicate the desired amount a pin 23 comes in contact with a dog 22 and moves the same and the shaft 21 and effects a movement of the registering wheel 17 through intermediate connecting means presently to be described. It is to be understood that each registering wheel 11 is provided with two sets of pins 12 and 23 projecting from opposite sides thereof, the pins 12 coöperating with the jacks or operating bars 5 and detents 24 and the pins 23 arranged to act jointly with the dogs 22 to effect a rocking of the shaft 21. The pins 23 are differently positioned depending upon the amount to be registered by each wheel.

An arm 25 fastened to the shaft 21 supports a dog 26, which latter is pivoted thereto and has its upper end arranged to engage with the teeth of a ratchet wheel 27 applied to or forming a part of the registering wheel 17. Each time the shaft 21 is rocked the arm 25 is moved upward at its outer end, thereby lifting the dog 26 and moving the registering wheel 17 the distance of one tooth so as to bring the next number in position to be read through an observation opening formed in the front of the casing. Upon operating any one of the keys 6 to register the required amount the primary registering wheel 11 is correspondingly moved a distance to indicate the amount marked upon the key and when the registering wheel has moved a distance to register twenty a pin 23 thereof comes in contact with the coöperating dog 22 and moves the shaft 21, thereby causing the registering wheel 17 to move forward and indicate the total amount.

A series of pins 28 project laterally from the wheel 17 and are adapted to be engaged by a detent 29, which is pivoted to a bar 30. The detent 29 is adapted to engage the pins 28 and prevent backward rotation of the registering wheel 17. A pin and slot connection 31 is formed between the detent 29 and dog 26 and is so arranged that upon movement of the dog 26 the detent 29 releases the registering wheel, thereby admitting of the same being moved forward with the dog 26 as the shaft 21 is rocked.

The registering wheel 18 is provided upon one side with a ratchet wheel 32 and a dog 33 is arranged to coöperate with the teeth thereof so as to move the registering wheel 18 forward one tooth at each complete revolution of the registering wheel 17. The dog 33 is carried by an arm 34 fastened to a shaft 35 so as to have a pivotal movement. The end of the arm 34 projects across the path of a pin 35 extending laterally from the registering wheel 17. As the registering wheel 17 completes its revolution the pin 35 engages with the arm 34 and moves the same to operate the dog 33, which latter moves the registering wheel 18 forward one tooth. A detent 36 coöperates with the series of pins 32 projecting laterally from the registering wheel 18 to prevent backward rotation of said registering wheel. The detent 36 is pivoted to a bar 37. A link 38 connects the detent 36 with the arm 34, whereby when said arm 34 is actuated the detent 36 is moved to release the registering wheel 18 and thereby admit of its forward movement.

The two shafts 9 and 15 are held against rotation and are secured by lock means. A disk 39 is fastened to the shaft 15 and has a notch 40 to receive the end of a dog 41. A disk 42 is secured to the shaft 9 and is provided with a notch 43 to receive the end of a lock dog 44. The dogs 41 and 44 are pivoted to opposite ends of a lever 45, which has one end extending into the path of the nib of a key 46, which, when introduced into the keyhole and turned, moves the lever 45 so as to throw the dogs 41 and 44 and thereby release the shafts 15 and 9, whereby they may be turned by hand to return the registering wheels to zero or initial position.

The number of square feet in any board to be measured is ascertained on reference to the measure provided upon the table 1 and is indicated upon the registering mechanism by operating one or more of the keys.

Each time any one of the primary registering wheels 11 is moved to indicate twenty or a predetermined amount a pin 12 thereof comes in contact with and operates a dog 22 and rocks the shaft 21, and by means of the arm 25 and dog 26 turns the registering wheel 17 one tooth so as to indicate the required amount.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a lumber register the combination of a measure for indicating the number of square feet in a board, said measure comprising a series of tables or scales, and a registering mechanism for indicating the amount designated by the measure, said registering mechanism comprising a series of registering wheels and a corresponding number of keys, each key corresponding with a scale or table of the lumber measure.

2. In a register the combination of a series of primary registering wheels, a series of coöperating keys therefor, a registering mechanism for indicating the total amount, a series of dogs one for each primary registering wheel to be actuated thereby when the same has moved to designate a predetermined amount, an operating means adapted to be actuated when any one of the series of operating dogs is moved to advance the totalizing registering mechanism one step.

3. In combination a series of primary registering wheels, a corresponding number of keys therefor, a totalizing registering mechanism, a rock shaft, a series of dogs mounted upon the rock shaft and extending into the path of the several primary registering wheels to be actuated thereby, and connecting means between said rock shaft and the totalizing registering mechanism for moving the latter forward one step each time the rock shaft is operated by any one of the series of primary registering wheels.

4. In combination a series of primary registering wheels, coöperating keys therefor, a totalizing registering mechanism, a rock shaft, a series of dogs mounted upon the rock shaft and extending into the path of the several primary registering wheels to be operated thereby, an arm extended from the rock shaft, and a dog mounted upon said arm and adapted to actuate the totalizing registering mechanism at each movement of the rock shaft when operated by any one of the primary registering wheels.

5. In combination a registering wheel, an arm adapted to be intermittently rocked by means of the said registering wheel, a dog pivotally mounted upon said rocking arm, a second registering wheel adapted to be intermittently operated by means of said dog, a detent adapted to coöperate with said second registering wheel, a pin and slot connection between said detent and dog, and a bar pivotally supported and having said detent pivotally connected thereto.

6. In combination a registering wheel, a rock shaft, a dog secured to said rock shaft and adapted to be intermittently actuated by the registering wheel to impart movement to said rock shaft, an arm secured to said rock shaft, a dog pivotally mounted upon said arm, a second ratchet wheel adapted to be operated by means of said dog, a detent adapted to coöperate with said second ratchet wheel, a pin and slot connection between said detent and dog, and a bar pivotally supported and having pivotal connection with the said detent.

7. In combination a registering wheel having a projection and adapted to be intermittently operated, a second registering wheel, a pivoted arm adapted to be operated by the projection of the first mentioned registering wheel, an operating dog carried thereby and adapted to move the second registering wheel, a pivotally mounted detent, and a link between said detent and pivoted arm, whereby the second registering wheel is released when the pivoted arm is operated.

In testimony whereof I affix my signature in presence of two witnesses.

ROBERT L. LOWERY.

Witnesses:
N. B. McCANLESS,
J. D. NORWOOD.